(12) United States Patent
Apostolopoulos

(10) Patent No.: US 7,505,590 B1
(45) Date of Patent: Mar. 17, 2009

(54) METHOD AND SYSTEM FOR PROVIDING TRANSCODABILITY TO FRAME CODED STREAMING MEDIA

(75) Inventor: John Apostolopoulos, Palo Alt, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 687 days.

(21) Appl. No.: 10/617,348

(22) Filed: Nov. 14, 2003

(51) Int. Cl.
  *H04N 7/167* (2006.01)
(52) U.S. Cl. .................. 380/210; 380/217; 380/239; 713/160
(58) Field of Classification Search ............... 380/200, 380/28, 217, 210; 713/160
See application file for complete search history.

(56) References Cited

U.S. PATENT DOCUMENTS 6,804,257 B1 * 10/2004 Benayoun et al. ........... 370/471
6,963,972 B1 * 11/2005 Chang et al. ................ 713/153
7,054,335 B2 * 5/2006 Wee et al. ................... 370/486
2002/0163911 A1 * 11/2002 Wee et al. ................... 370/389

OTHER PUBLICATIONS

Susie J. Wee and John G. Apostolopoulos, Secure Scalable Video Steaming for Wireless Networks, IEEE international conference, Salt Lake City, Utah, Published on May 2001, retrieved date Nov. 18, 2006.*
Ruibiao Qiu and Wei Yu, An Efficient Quality Scalable Motion-JPEG2000 Transmission Scheme, Department of Computer Science Washington University, Nov. 6, 2001, retrieved date: Jun. 2, 2007.*

* cited by examiner

*Primary Examiner*—Gilberto Barron, Jr.
*Assistant Examiner*—Samson B Lemma

(57) ABSTRACT

Disclosed are methods and systems for providing transcodability to media in a network, comprising separating an amount of media data into a segment, and combining the segment and a transcoder readable payload header into a data packet payload, wherein the segment comprises data coded in a frame.

34 Claims, 17 Drawing Sheets

APPLICATION-LEVEL ENCRYPTION

NETWORK-LEVEL ENCRYPTION

METHOD AND SYSTEM FOR PROVIDING TRANSCODABILITY TO FRAME CODED STREAMING MEDIA

FIELD OF THE INVENTION

The present invention relates to the field of streaming media. More specifically, the present claimed invention relates to security during the transcoding of streamed, frame-coded, data.

BACKGROUND ART

Streaming media environments present many challenges for the system designer. For instance, clients can have different display, power, communication, and computational capabilities. In addition, communication links can have different maximum bandwidths, quality levels, and time-varying characteristics. A successful data streaming system must be able to stream data to different types of clients over time-varying communication links, and this streaming must be performed in a scalable and secure manner. Scalability is needed to enable streaming to a multitude of clients with different device capabilities and security is important, particularly in wireless networks, to protect content from eavesdroppers.

In order to achieve scalability and efficiency in streaming environments, it is necessary to adapt, or transcode, the compressed data stream at intermediate network nodes. A transcoder takes a compressed data stream as the input, then processes it to produce another compressed data stream as the output. Exemplary transcoding operations include bit rate reduction, rate shaping, spatial down-sampling, frame rate reduction, and changing compression formats. Network transcoding can improve system scalability and efficiency, for example, by adapting the spatial resolution of a data stream for a particular client's display capabilities or by dynamically adjusting the bit rate of a data stream to match a wireless channel's time-varying characteristics.

By way of example, a streaming media video clip may be part of a presentation of a web page. Large and powerful desktop receivers on a large bandwidth connection may receive and decrypt a full resolution, full frame rate, video stream of high-definition television (HDTV) for instance. However, a wireless adjunct to the same network may only be able to connect wireless users at a much smaller bandwidth. Therefore, the stream must be converted to a smaller bandwidth signal in order to be carried. Transcoding can achieve this conversion.

While network transcoding facilitates scalability in data streaming systems, it also poses a serious threat to the security of the streaming system. This is because conventional transcoding operations performed on encrypted streams generally require decrypting the stream, transcoding the decrypted stream, and then re-encrypting the result. Because every transcoder must decrypt the stream, each network transcoding node presents a possible breach in the security of the entire system.

Furthermore, there are potential transcoding nodes in many extensive networks that, unfortunately, cannot be trusted. These untrusted nodes may be individual computers, client intranets at remote locations, or any other node that is interposed between an original sender and an intended receiver.

More specifically, in conventional media streaming approaches, for example, employing application-level encryption, media data is first encoded, or compressed, into a bitstream using inter-frame compression algorithms. The resulting bitstream can then be encrypted, and the resulting encrypted stream is packetized and transmitted over the network using a transport protocol such as unreliable datagram protocol (UDP).

It is noted here that, as used herein, terms such as "encode, decode, encoding, decoding, encoded, decoded, coding, decoding," etc., refer to the compression or other encoding of data into forms suitable for transport over network carriers, whether those carriers are cable, optical fiber, wireless carrier or other types of network connection. As used herein, such terms as "Encrypt, decrypt, encrypting, decrypting, encryption, decryption," etc., refer to cryptographic encoding that is used to protect the security of data from unauthorized recipients or to verify that the data received is exactly what was originally sent.

Prior art FIG. 1A is a block diagram, 100, which illustrates the order in which conventional application-level encryption is performed. In this example, Compression Encoding, 102, is followed by Encryption, 103, and Packetization, 104. Packetization is the combining of appropriate length segments of encrypted data into packets for transmission in a network.

Prior art FIG. 1B is a block diagram, 105, which illustrates the order in which conventional network-level encryption is performed. In this example, Compression Encoding, 106, is followed by Packetization, 107, and then Encryption, 108. Again, packetization places the encrypted data into packets for transmission in a network.

Prior art FIG. 1C illustrates a conventional transcoding process. If transcoding is required between the sender and the receiver of the stream, then the reassembly and decryption discussed in conjunction with FIG. 1B must take place. In FIG. 1C, a functional block diagram of a transcoding process is illustrated in which encrypted data must be transcoded for reasons discussed previously. In process 120, the media stream is decrypted at 122, transcoded at 124, then re-encrypted at 126. During the period in which the data is unencrypted, it is accessible to unauthorized reading or corruption at an insecure or untrusted node. Furthermore, every node that performs decryption requires the decryption key, increasing the number of places where the key can be compromised and increasing the vulnerability of the system. In conventional video stream transcoding, for example, the transcoder must be able to read the content of a packet to perform transcoding. Hence the decryption/re-encryption of FIG. 1C.

Although the above-listed discussion specifically mentions the shortcomings of prior art approaches with respect to the streaming data, such shortcomings are not limited solely to the streaming of video data. Instead, the problems of the prior art span various types of media including, but not limited to, audio-based data, image-based data, speech-based data, graphic data, web page-based data, and the like.

However, the shortcomings of the prior art are well illustrated with reference to frame-coded, video, streaming. It is noted here that a common standard for digital video compression and transmission is that of the Moving Picture Experts Group, commonly known as MPEG. MPEG uses the similarity between frames to create a sequence of I, B, and P frames. Only the I-frame contains all the compressed data necessary to produce a complete frame image. The B and P frames only contain information relating to changes since the last I frame. MPEG 1 and MPEG 2 are the primary modes of digital video in common use. MPEG 2 supports a much higher quality and data rate than MPEG 1 and is the format most commonly favored for video on demand, DVD, and is the format chosen for transmitting Digital Television. MPEG-4 is also gaining in popularity. In addition, H.261, H.263, and the emerging H.264 are important video compression standards.

In prior art FIG. 1D, the coded frames component of a compressed streamed video signal is illustrated. An exemplary video GOP, or Group of Pictures, is shown at 120. GOP 120, contains an I-frame, 121, and several B-frames, 122, 124, 126 and 128, and P-frames, 123, 125 and 127. Another I-frame is shown at 129. It is noted that I-frames are illustrated larger than P-frames and B-frames are illustrated smaller. The relative size in the illustration is to show the relative compression available from each type of frame. An I-frame offers the least compression and a B-frame offers the most.

Accordingly, a method and/or system that can enable a potentially untrusted transcoder in a network to transcode a media stream while still preserving the end-to-end security of the rest of the stream would be valuable. Specifically, a means for transcoding, that allows a potentially untrusted transcoder to perform the transcoding in an appropriate manner, yet still allows the intended receiver to receive valid transmitted data and yet allows any encryption of the transmitted data to remain uncompromised, would be valuable.

SUMMARY OF THE INVENTION

Disclosed are methods and systems for providing transcodability to media in a network, comprising separating an amount of media data into a segment, and combining the segment and a transcoder readable payload header into a data packet payload, wherein the segment comprises data coded in a frame.

BRIEF DESCRIPTION OF THE DRAWINGS

The operation of this invention can be best visualized by reference to the drawings.

DETAILED DESCRIPTION

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

Presented herein are methods and systems that provide for secure streaming of media over networks. Specifically, embodiments of the present invention relate to secure transcoding, by potentially untrusted nodes, of streaming video or other media that is coded, for example, in an I/P/B-frame format. More specifically, disclosed herein are methods and systems for designing and performing the data packet such that, as long as the potentially untrusted transcoder performs the transcoding in the appropriate manner, the receiver is able to receive a transcoded stream while preserving end-to-end security.

Secure transcoding is desirable in situations where a potentially untrusted transcoder cannot be guaranteed to be unassailable during and after transcoding. Embodiments of the present invention allow transcoding to take place without requiring decryption at the transcoding node. As a result, the media remain encrypted in every location except at the sender and receiver. Furthermore, an encryption key is not available except to the sender and receiver.

Figure 1A:
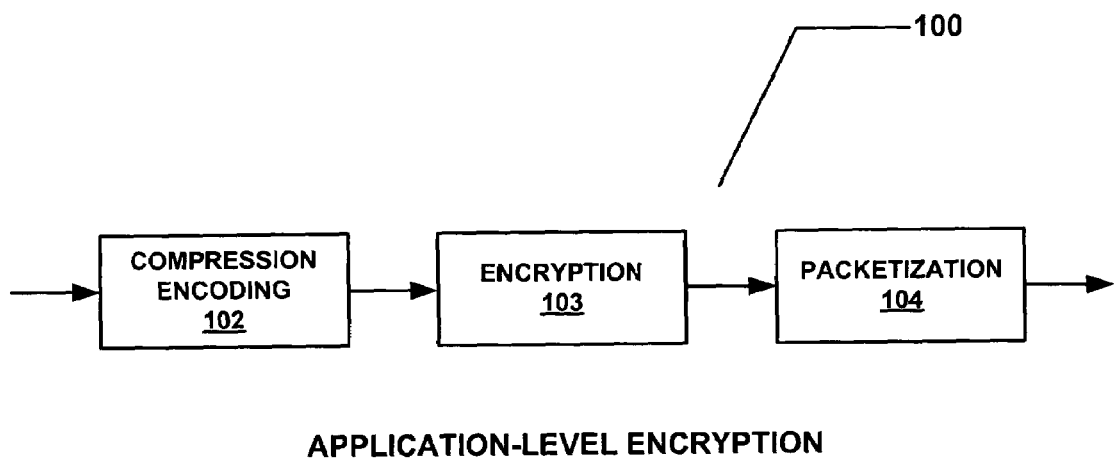
FIG. 1A (Prior Art) is a block diagram which illustrates the order in which conventional application-level encryption is performed.
Figure 1B:
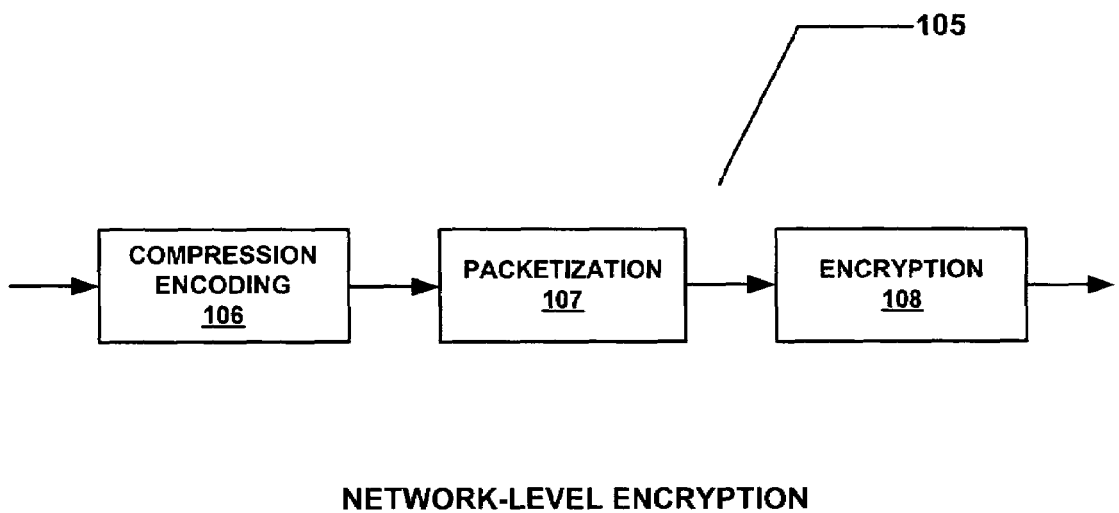
FIG. 1B (Prior Art) is a block diagram which illustrates the order in which conventional network-level encryption is performed.
Figure 1C:
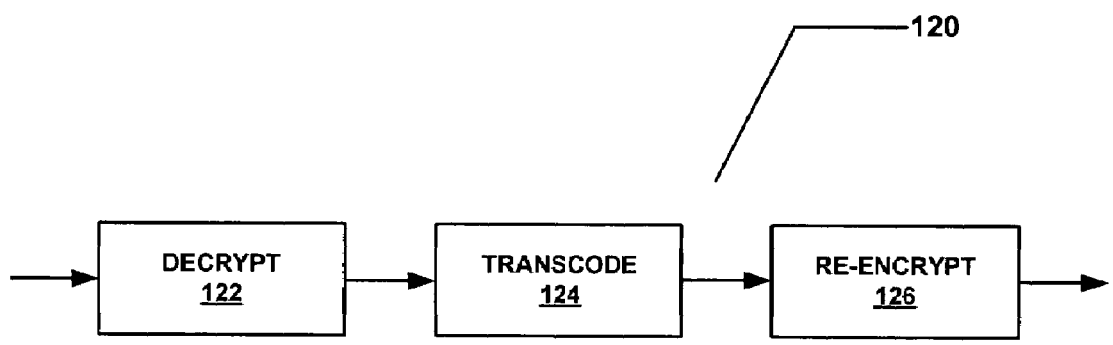
FIG. 1C (Prior Art) is a block diagram which illustrates a conventional transcoding process in an encrypted media stream.
Figure 1D:
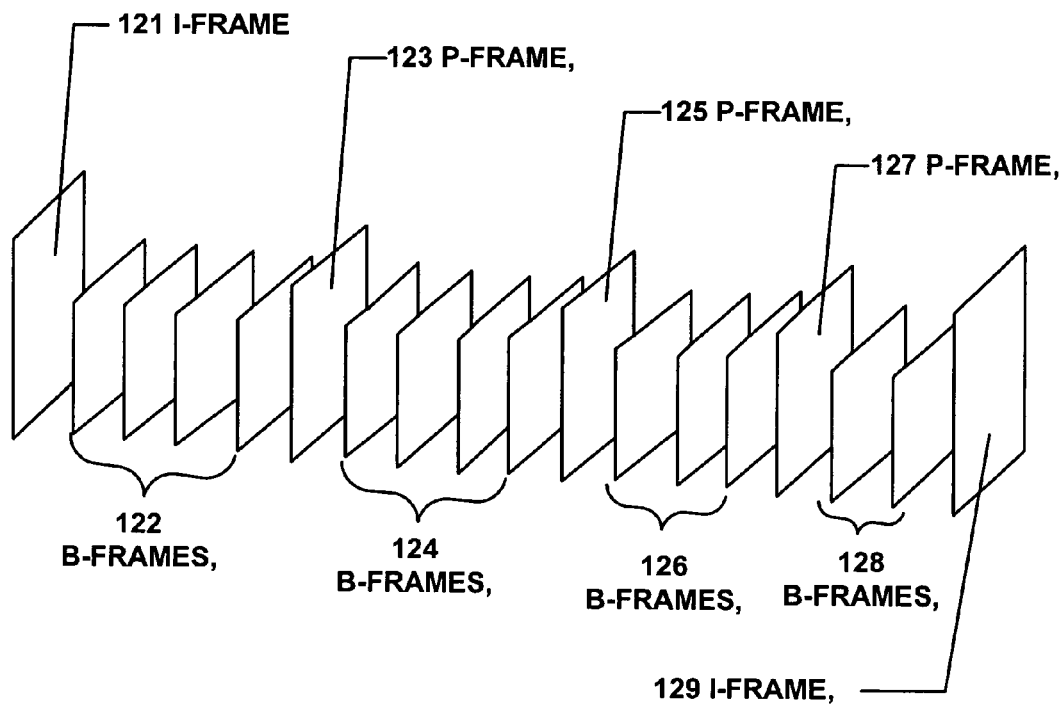
FIG. 1D (Prior Art) is an illustration of coded frames associated with a conventional video compression scheme employed in streamed media communication.
Figure 2:
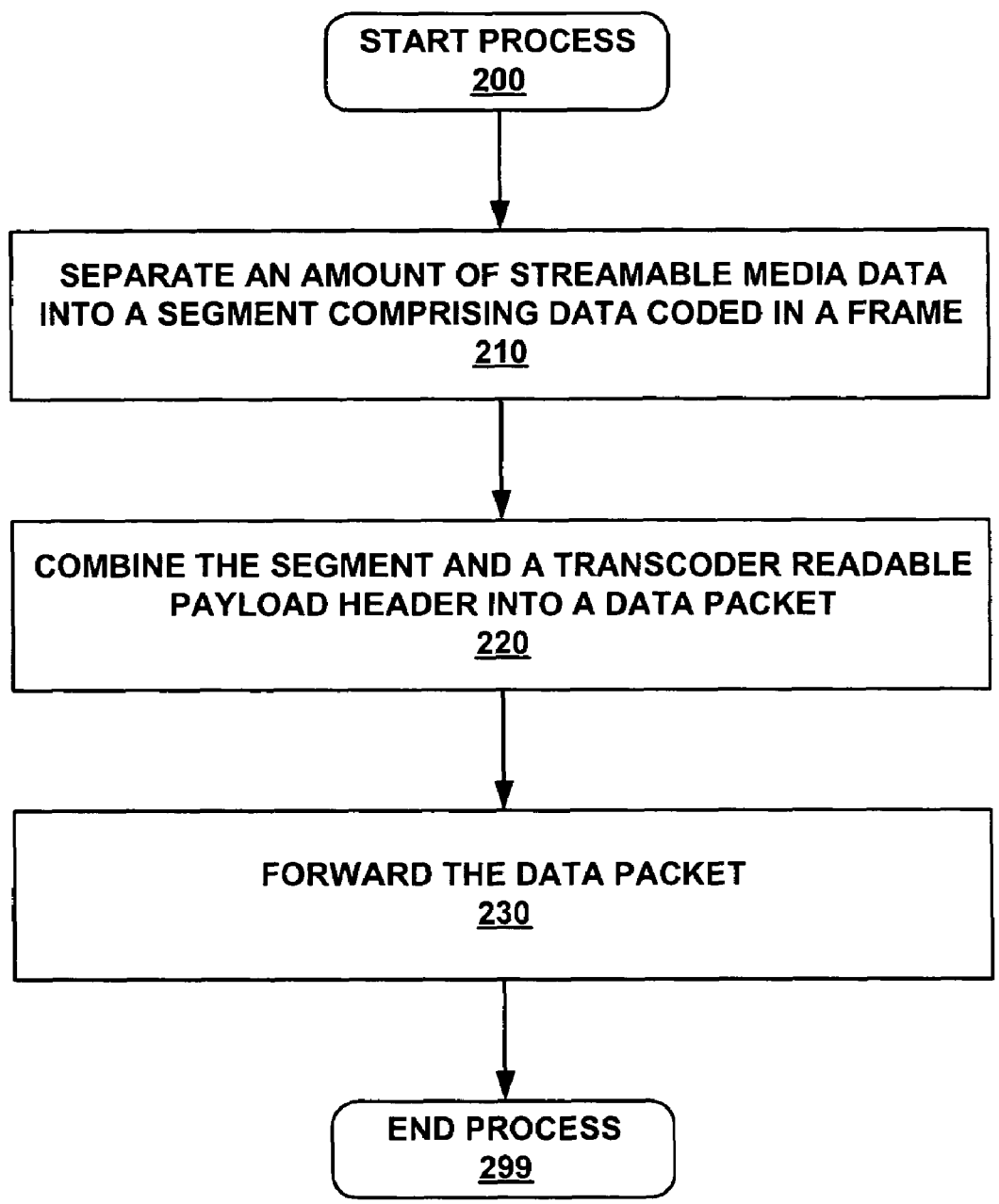
FIG. 2 is a block diagram which illustrates a packetization method in accordance with embodiments of the present invention.

FIG. 2 illustrates one such embodiment of the present invention. FIG. 2 is a block flow diagram 200 illustrating a method of achieving a secure media streaming system that offers a means of overcoming the aforementioned shortcomings. In process 200, streamable media data is separated into appropriately sized segments suitable for incorporation into a data packet.

It is noted here that "media data" includes video, audio, speech, or any other data that is delivered to a receiver by streaming over a communication connection. In essence, the term refers to any type of data, deliverable in a network environment, that, in the embodiments of the present invention discussed here, is codable in frames.

At 220, the segments, which may be encrypted, are combined into data packets along with a payload header that is readable by an intermediate transcoder. In some embodiments, the data segment and the transcoder-readable payload header comprise the payload of the data packet. There is also, typically, a packet header associated with every packet that contains the size, timing, addressing and other information associated with transmitting a packet in a network. The packet header and the transcoder-readable payload header do not accomplish the same functions. The transcoder-readable payload header comprises information related to truncation points and the relative dependencies of the coded frames contained in the payload. In some embodiments, the packet is then forwarded in the network at 230.

It is noted here that the transcoder-readable payload header is much smaller in size than the segment comprising the payload. A typical packet can comprise data, comprising payload, transcoder-readable payload header, and packet header, that is generally on the order of 500 to 1500 bytes in size. A transcoder-readable payload header is on the order of 20-50 bytes. Very little, if any, packet capacity is lost when the transcoder-readable payload header is included.

It is noted that the payload data, in one embodiment, comprises coded frames, or portions of coded frames, that conform to a compression standard that employs I-frames, P-frames, and B-frames. A commonly used compression standard, accommodated in embodiments of the present invention, is the set of standards of the Motion Picture Experts Group, known as MPEG. For clarity and brevity of discussion, embodiments of the present invention are, in many cases, directed to MPEG compression. However, the features of the present invention are not so limited, and the examples of MPEG compression can be extended to other types of media data.

Figure 3:
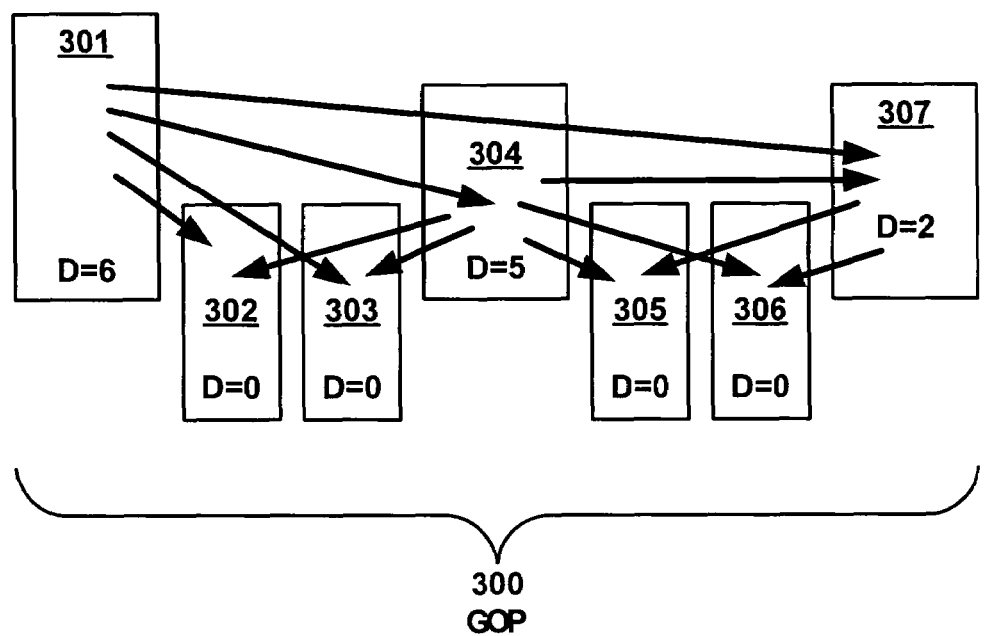
FIG. 3 illustrates the relative frame dependencies and priorities in an MPEG GOP in accordance with embodiments of the present invention.

The transcoder-readable payload header, as noted above, contains information about relative dependencies between coded frames in a compressed video stream. FIG. 3 illustrates such dependencies. The frames illustrated as blocks in FIG. 3 comprise a Group of Pictures, or GOP. An MPEG GOP typically comprises one or more I-frames, one or more P-frames, and, commonly, one or more B-frames. In MPEG compression, as noted earlier, an I-frame contains all the information to produce a complete image. A "predictive" P-frame, depends on an I frame or a previous P-frame for some of the requisite data. A "bi-directional" B-frame depends on both I-frames and P-frames for some data and depends on data from both previous and subsequent frames. As a result, B-frames offer the most compressibility in a video stream and I-frames offer the least. Only an I-frame can produce a complete image without depending on data from another frame.

Illustrative MPEG GOP 300 contains I-frame, 301, followed by B-frames, 302 and 303, P-frame, 304, B-frames, 305 and 306, and P-frame, 307. In GOP 300, I-frame 301 shows "D=6". This is a dependency designation meant to show that six other frames depend on I-frame 301. If I-frame 301 were to be unavailable, the other frames in the GOP would be unable to produce a complete image at the receiver. P-frame 304 shows a dependency of five, meaning five other frames read data from P-frame 304. P-frame 307 shows a dependency of two, meaning two other frames read data from P-frame 307. All of the illustrated B-frames show a dependency of zero. It is noted here that the loss of a B-frame would have the least impact on the streamed data, with only the image information contained in the B-frame lost. The loss of a P-frame would lose not only its contained image information, but also the information of B-frames that depend on that P-frame for a complete image. The loss of an I-frame would result in the loss of all of the image data in frames that depend, directly or indirectly, on that I-frame. In the illustrated GOP, the loss of I-frame 301 would result in the loss of the entire GOP's images.

Embodiments of the present invention are enabled to form data packets comprising an entire GOP such as GOP 300, one or more frames from a GOP, a single frame, or a portion of a frame. In each case, the transcoder-readable payload header associated with the payload contains the truncation points for coded and encrypted frames in the payload and also the relative dependencies of the frames. The transcoder-readable payload header does not contain information related to the image data content and has no need to. A "dependency" can be said to be a relative importance of the frame.

It is noted here that a relative dependency can also be understood as a relative priority. The most expendable frames in GOP 300 are the B-frames whose dependency is D=0. The next most expendable is P-frame 307 whose dependency is 2, then P-frame 304 whose dependency is 5, and I-frame 301 whose dependency is 6. The priority of each frame, therefore, is analogous to its relative dependency, with lower valued frames being more expendable than higher valued frames.

In the exemplary GOP 300 shown in FIG. 3, the B-frames, 302, 303, 305 and 306, are shown with equal dependency or priority. In an embodiment of the present invention, any priority determination between equal-priority B-frames is made by sequential order in the GOP. As an example, in GOP 300, B-frame 306 is the most expendable because it can be truncated from the GOP 300 most readily. Though other embodiments can use other means of determination, truncation in order from back to front is a implementable transcoding scheme and can be extended to the prioritization of frames. Transcoding can also be based on the time to required delivery. For example, given two B-frames with different probabilities of arriving on time for their respective playout deadlines, the one with the lower probability can be discarded first.

Figure 4:
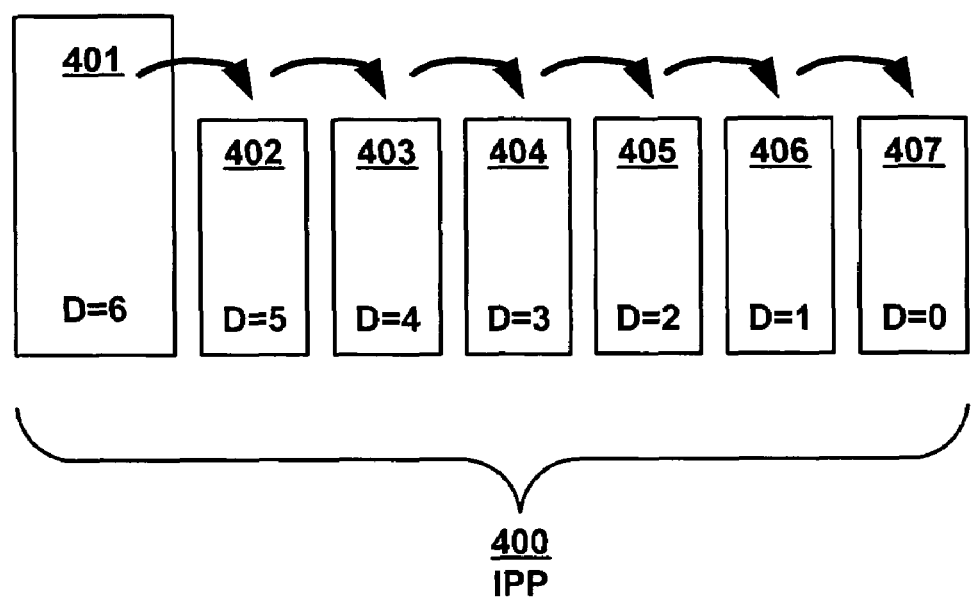
FIG. 4 illustrates the relative frame dependencies and priorities in an MPEG IPP in accordance with embodiments of the present invention.

FIG. 4 illustrates an alternative form of a GOP, known as an IPP. An IPP comprises only I- and P-frames. IPP 400 comprises I-frame 401 whose dependency is six, and P-frames 402 through 407, whose dependencies range from five to zero, respectively. Because P-frames relate to a previous frame, each P-frame depends on the previous P-frame which also depends on the previous frame. As a result, if the last frame in the IPP sequence is removed, such as by truncation, only the image from the removed frame is lost. Any successive truncation removes more important contained data. In this way, a back-to-front truncation of an IPP sequence comprises a hierarchical transcoding scheme.

Figure 5A:
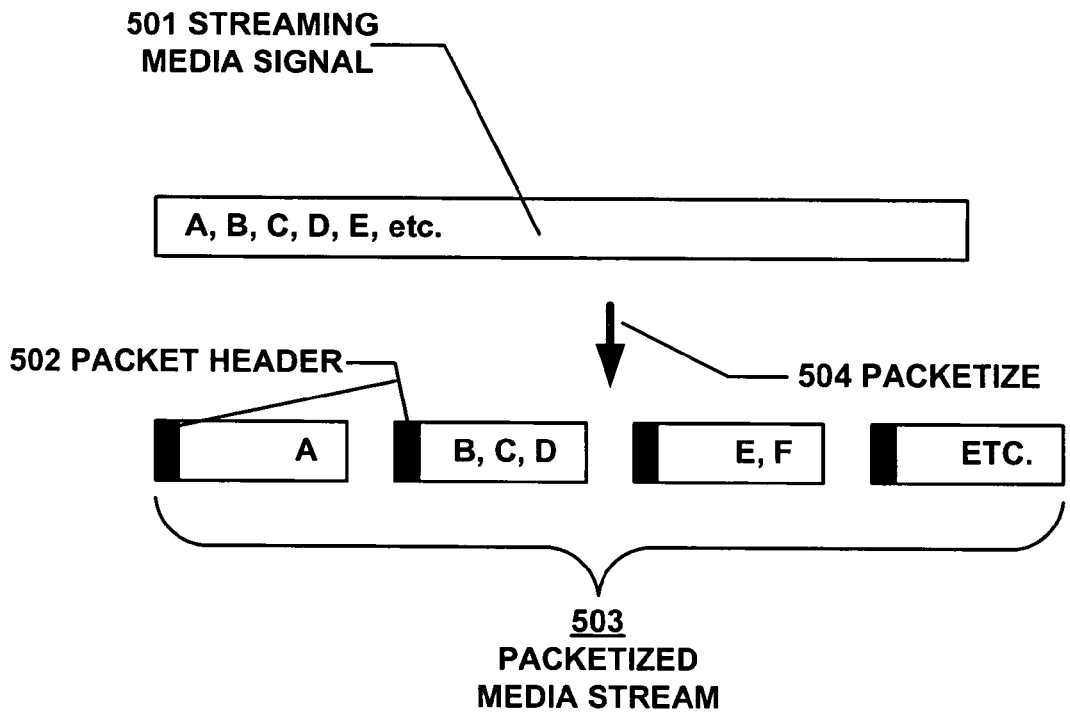
FIG. 5A illustrates the packetization of streamable data in accordance with embodiments of the present invention.

FIG. 5A illustrates a packetized data stream as produced by embodiments of the present invention. Packetization, 504, separates the streamable data 501, consisting of the necessary media components, into packets of the network's required size, 503. Some embodiments further add a packet header 512 to each packet. It is noted that, typically, all of the packets must be reassembled into the encrypted media stream in order to decrypt the data.

Figure 5B:
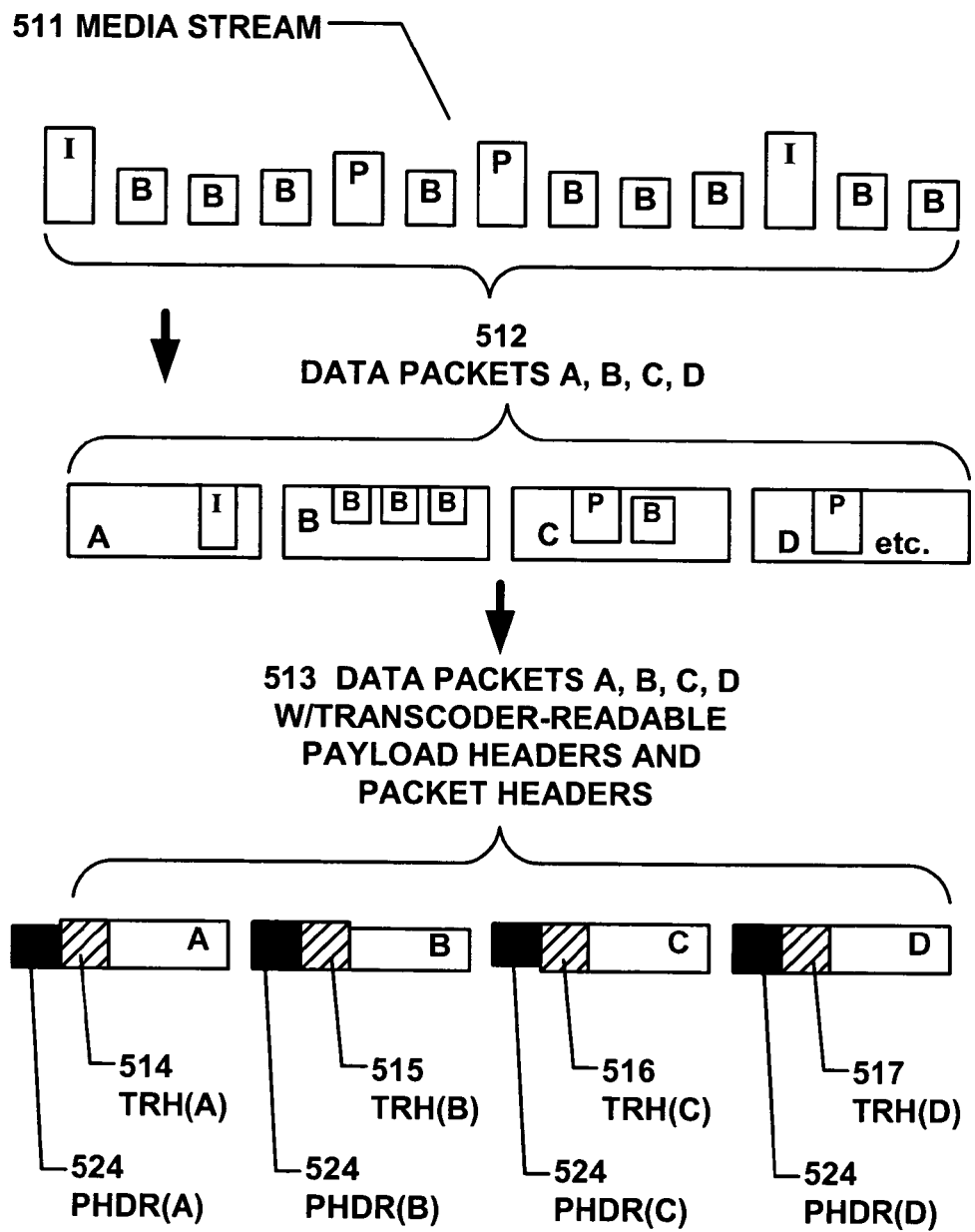
FIG. 5B illustrates the packetization of I, P and B-frame video in accordance with embodiments of the present invention.

FIG. 5B illustrates the functionality of an embodiment of the present, invention in which transcoding can occur by truncation. Media stream 511 is separated into packets, 512, each comprising, one or more coded I-, P- or B-frames. It is noted here again that a packet payload can comprise a portion of a frame, a single frame, or a plurality of coded frames. As shown at 513, a transcoder-readable payload header (TRH) is written for each payload and a packet header (PHDR) is written for each packet. Transcoder-readable payload header 514, for example, is computed for the first independently decodable part, A, shown as TRH(A). Transcoder-readable payload header 514 reflects the content of packet A, which is, in this illustration, a single I-frame. The transcoder-readable payload header, 515, for packet B reflects the three B-frames of this example as the other transcoder-readable payload headers reflect the same information for their respective payloads. Again, in this embodiment of the present invention, the transcoder-readable payload headers reflect truncation, or start and end, points of portions of the packet payload, as well as the relative importance of those portions. The headers do not reflect the image content. The payloads containing the coded frames are encrypted, when applicable, separately from the transcoder-readable payload headers.

It is noted that, in embodiments of the present invention, the transcoder-readable payload header, if encrypted, is encrypted using a separate encryption key than that used to encrypt the payload data. By using a separate key, any transcoders in a system are able to decrypt the transcoder-readable payload header but are not able to decrypt the payload data. This feature aids in maintaining end-to-end security of the transmitted payload data. In another embodiment, the transcoder-readable payload header remains unencrypted while the payload's coded frames are encrypted. In this embodiment, no decryption key is required at the transcoder.

Figure 6A:
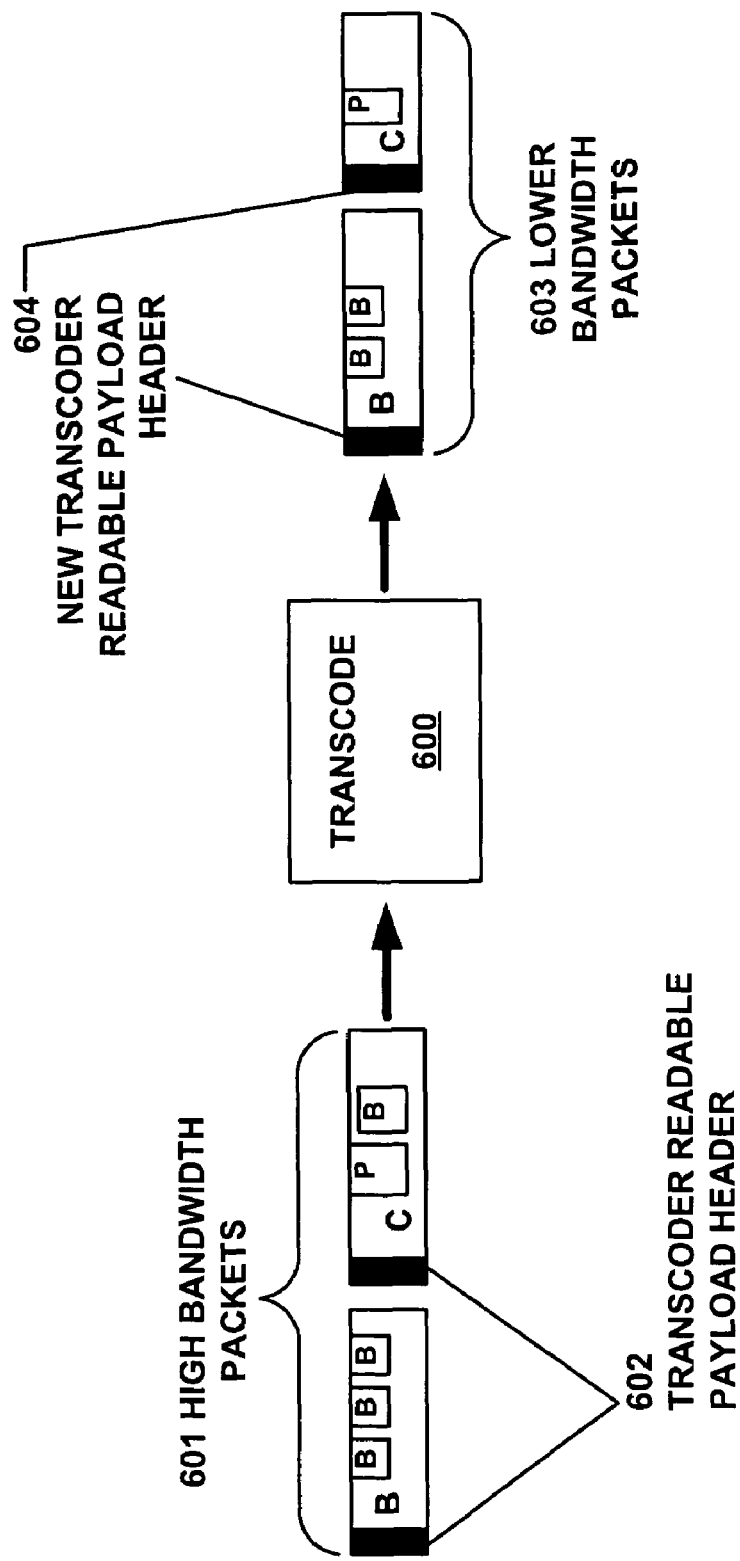
FIG. 6A illustrates a transcoding process in accordance with embodiments of the present invention.

FIG. 6A illustrates transcoding in one embodiment of the present invention. When transcoding, 600, occurs in this embodiment of the present invention, the transcoder truncates lower priority, or lower dependency, portions of the packet before higher priority parts. In the example illustrated in FIG. 6A, high bandwidth packets B and C, 601, comprising three B-frames and a P-frame and B-frame, respectively, arrive at transcoding 600. Each packet has a transcoder-readable payload header, 602. Transcoding 600 is enabled to read transcoder-readable payload header 602 without decrypting the payload. By virtue of the information in transcoder-readable payload header 602, transcoding 600 can delete one or more coded frames from the payloads without reading the frames themselves. In the example illustrated in FIG. 6A, data packets B and C are both transcoded by the truncation of one B-frame.

It is noted again that transcoding 600 can determine the truncation points, those points in the payload between frames, without reading the frames. If the coded frame data is encrypted, the transcoder-readable payload header containing truncation point data is either unencrypted or is encrypted with a key separate from that of the payload's encrypted, coded, frames.

It is noted that, in some embodiments, transcoding can occur by deleting multiple frames from a packet or by deleting entire packets from the media stream. After transcoding, the lower bandwidth-requisite packets, 603, each have a new transcoder-readable payload header written to reflect the new content of their respective payloads.

In another embodiment, a new transcoder-readable payload header is not written after transcoding. When transcoding consists of truncating one or more frames at the end, sequentially, of the packet payload, the truncation points of the remaining frames, as read from the front of the packet payload, do not change. These truncation points can be read by subsequent transcoding without a new transcoder-readable payload header having to be written and subsequent transcoding can still take place.

As in the previous transcoder-readable header, information about the start and end points of frames included in the packet payloads and their relative priority is included but information disclosing the contents of the payload's encrypted data content is not. Indeed, because the new transcoder-readable header is written by a transcoder which does not have the key with which to decrypt the packet payloads, the new transcoder-readable header is not capable of disclosing packet payload contents.

With either a new transcoder-readable header or with a pre-existing transcoder-readable payload header, possible further transcoding and scaling is able to take place at another location downstream in the communication. In addition to packet payload size and coded frame location, packet payload priority is included in the transcoder-readable header and other priority information can be included, such as information from a web page that is considered discardable by web page owner. In the case of transmission to a handheld device with a lower display capability than a large desktop computer, much of the information in some complex web pages is lost even if it is attempted to be displayed. By making this lower priority information removable in early transcoding, valuable bandwidth can be preserved for other uses when transmitting to these smaller devices.

Figure 6B:
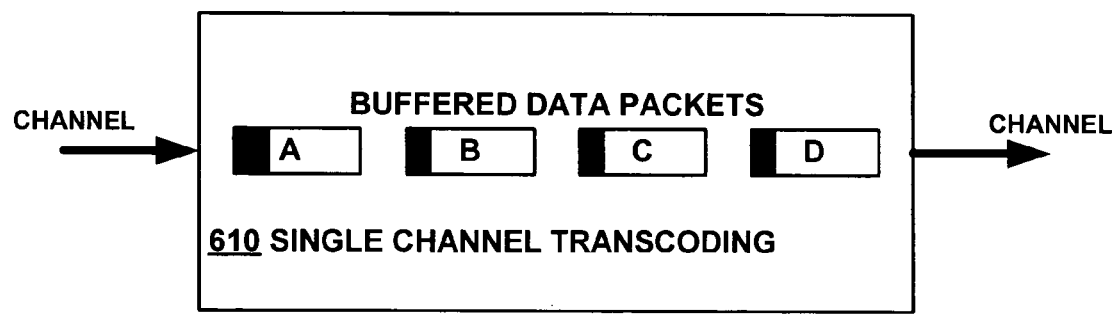
FIG. 6B illustrates a transcoding process in accordance with embodiments of the present invention.

FIG. 6B illustrates an embodiment of the present invention in which buffering is accomplished at the transcoding node. This enables proper sequencing and timing of the streamed media to be maintained in the dynamic environment of the modern complex network. Media stream 611 arrives at transcoding node 610 and is buffered. Each applicable packet is transcoded and then is either buffered before forwarding or is directly forwarded, 612.

Figure 6C:
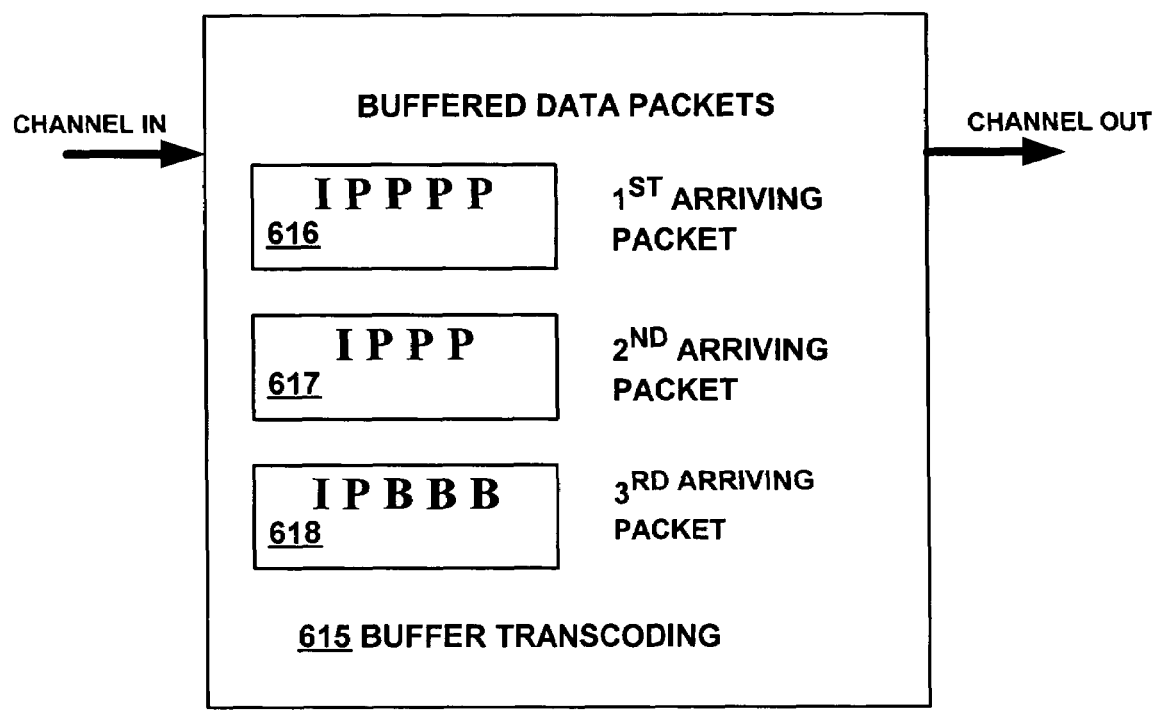
FIG. 6C illustrates a transcoding process in accordance with embodiments of the present invention.

One advantage of embodiments incorporating buffering is illustrated in FIG. 6C. In the example of FIG. 6C, packets 616, 617, and 618 have arrived at the transcoder in numerical order. The payload of packet 616 comprises an I-frame and four P-frames. The payload of packet 617 comprises an I-frame and three P-frames. Packet 618 has a payload comprising an I-frame, a P-frame and three B-frames. If buffering were not employed, each packet would be evaluated by the transcoder and, in the case where a single frame were to be truncated from each packet, transcoding would delete a P-frame from packet 616, a P-frame from packet 617, and a B-frame from packet 618. If buffering is employed, however, all three packets can be evaluated and the three lowest priority frames in the three packets can be deleted. In this example then, packet 618 would lose three B-frames and no higher-priority P-frames would be lost.

It is noted that transcoding in various embodiments of the present invention can use more sophisticated decision criteria than those illustrated in the example of FIG. 6C. However, buffering can enable transcoding to evaluate more than a single packet payload at a time. In this way, transcoding can more reliably select lower priority frames for truncation.

Figure 6D:
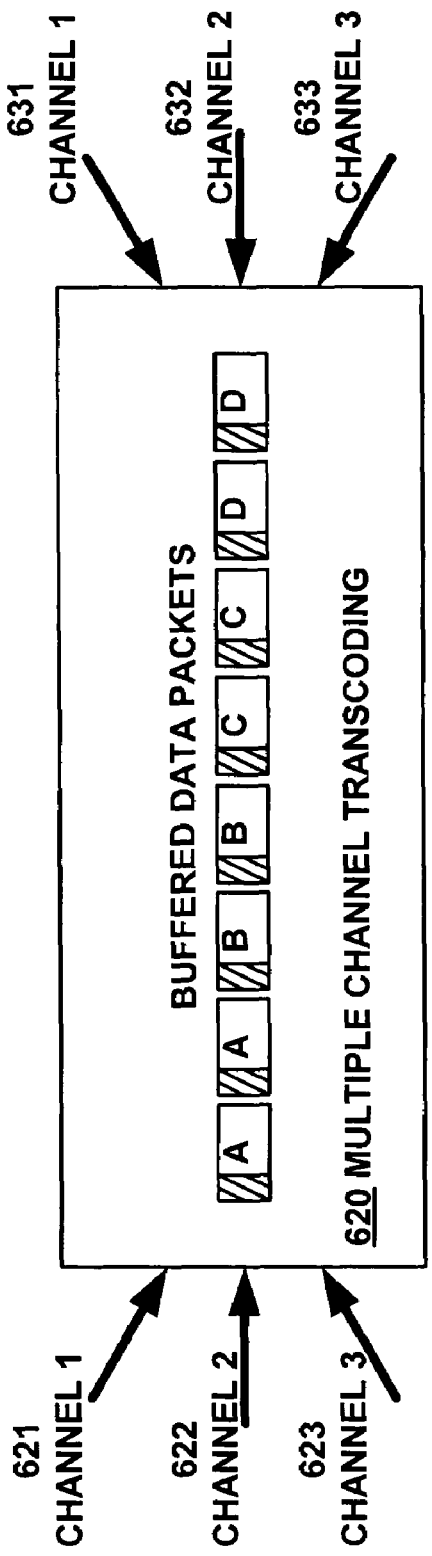
FIG. 6D illustrates a transcoding process in accordance with embodiments of the present invention.

FIG. 6D illustrates the transcoding of multiple channels in a network. Here three channels, 621, 622, and 623, are shown delivering streamed media to the transcoder, 620. It is noted that the packets illustrated in transcoding are shown for illustration only and do not necessarily indicate the actual content of a coded stream or of a transcoder buffer. A multiple channel buffering scheme can provide better transcoding performance and, ultimately, better quality video at each client constrained in a low bit-rate environment. Multiple channel buffering can also provide load balancing in a multi-channel communication environment.

Additionally, such a scheme can also provide cross channel packet comparisons, similar to that of the single channel buffering transcoder discussed in FIG. 6C, only including comparing packets communicated in different channels. After transcoding, the transcoded stream is, as in other embodiments, then forwarded to the respective recipients, here in Channels 631, 632, and 633, or is buffered for some other process. Transcoding in a multi-channel regime may also facilitate multiplex in that the transcoded packets can, in some implementations, be output in the same channel.

It is noted that the buffering represented in FIGS. 6B, 6C and 6D can, in some implementations, cause some time delay in the transcoding process. By buffering packets and looking across a set of packets from a single stream or across a set of packets from multiple streams, the transcoder can achieve higher transcoding performance by more effectively identifying which packets should be transcoded in order to meet the bit rate constraints(s). In this manner, the transcoder can achieve higher reconstructed quality at each client given the channel constraints, as compared to the case where the transcoder does not buffer and look across packets for performing the best transcoding. The multi-channel transcoding of FIG. 6C, especially, is enhanced by the ability to buffer each stream, perform transcoding across multiple streams and thus load-balance multiple channels.

It is also noted that there are many considerations affecting the transcoding of a media stream. Available bandwidth in a communication channel is a consideration as well as the capabilities of intended receivers. As an example, a 30 megabit image file is streamed to a group of receivers. Included in the group of receivers is a graphic work station with a very large, high resolution display and a handheld device with a 200×200 pixel display. If the purpose of receiving the image is to view it in its entirety, while the workstation can likely effectively view it in full resolution, attempting to transmit the image to the handheld device may be unsuccessful. A transcoded stream that limits the image file to what the handheld receiver can actually use effectively can prevent the handheld device from being rendered virtually unusable by a receiving bottleneck.

Another example of an advantage of embodiments of the present invention is the streaming of video to the same collection of receiving devices as in the example above. The high-power workstation may be able to view full resolution video at a full frame rate of 30 frames per second. The handheld device, however, may be processor limited to only five frames per second at its 40000 pixel resolution maximum. Attempting to deliver the full resolution, full frame rate, video to the handheld device may again render the handheld device unusable due to a processor bottleneck and the handheld device may not be able to display anything.

Transcoding the streamed video, in this case, balances the data stream to the capability of the receiver, providing an efficient use of communication and reception capabilities.

Figure 6E:
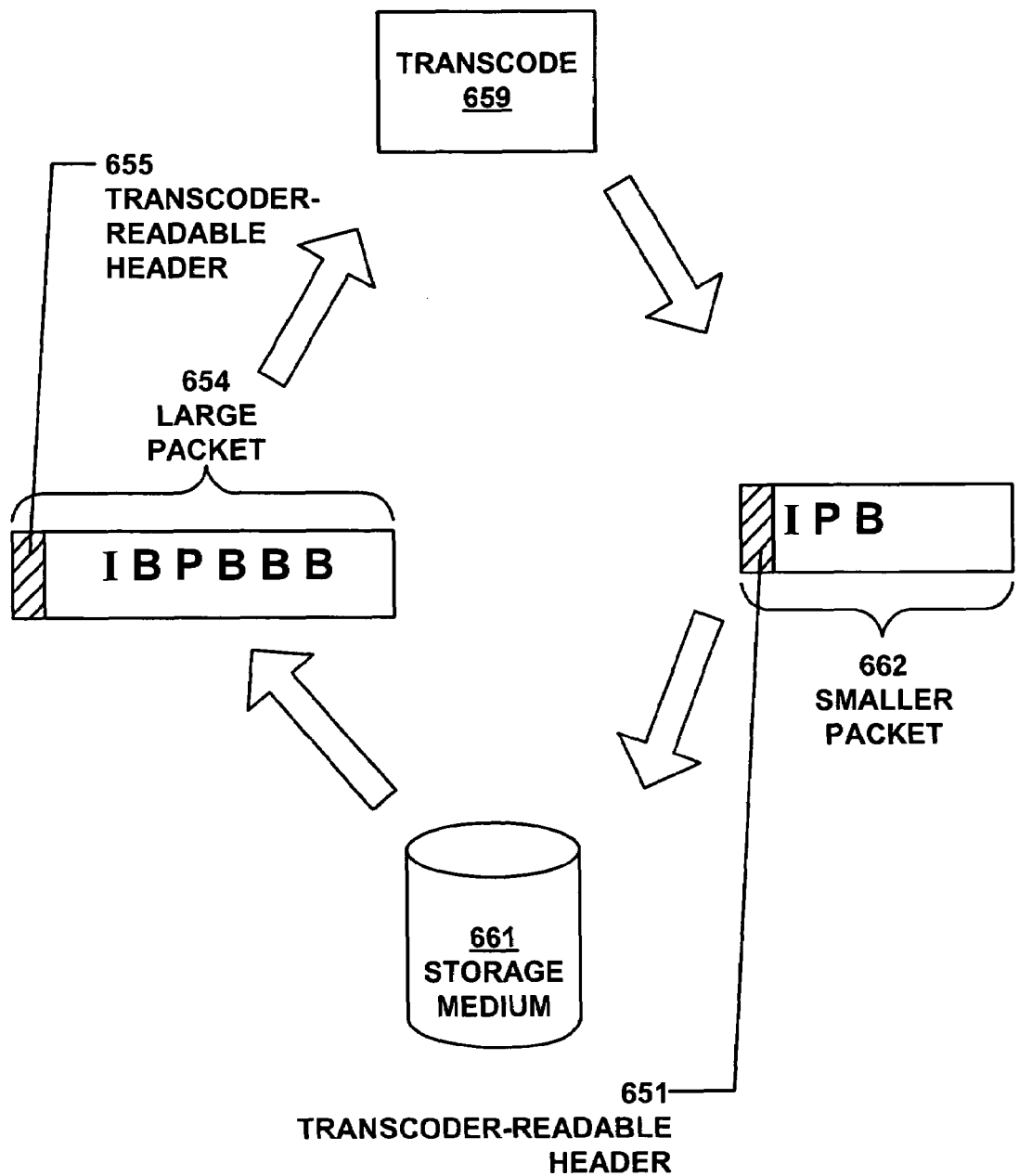
FIG. 6E illustrates a transcoding process associated with stored media in accordance with embodiments of the present invention.

Another embodiment is illustrated in FIG. 6E, in block format. Here, stored frame-coded data is manipulated by transcoding. Large data packet 654, comprising an I-frame, a P-frame and four B-frames, is taken from storage medium 661. In this example, data is, in essence, compressed to reduce storage space. This is accomplished by the removal of selected B-frames by transcoding, 659. The result of transcoding is the smaller data packet 662. It is noted that transcoding in this manner leaves the I, P and one B-frame of packet 654 intact in smaller packet 662. If necessary to later operations, transcoder-readable header 655 can be replaced by new transcoder readable header 651.

It is noted, as shown in the example of FIG. 6E, that the transcoding schemes provided by embodiments of the present invention are not limited to streamed data but can also be used in stored data. Additionally, the transcoding techniques are useful for unencrypted as well as encrypted data. In either case, transcoding can occur without disruption of the remaining frames and without having to read the encoded frames.

Figure 7:
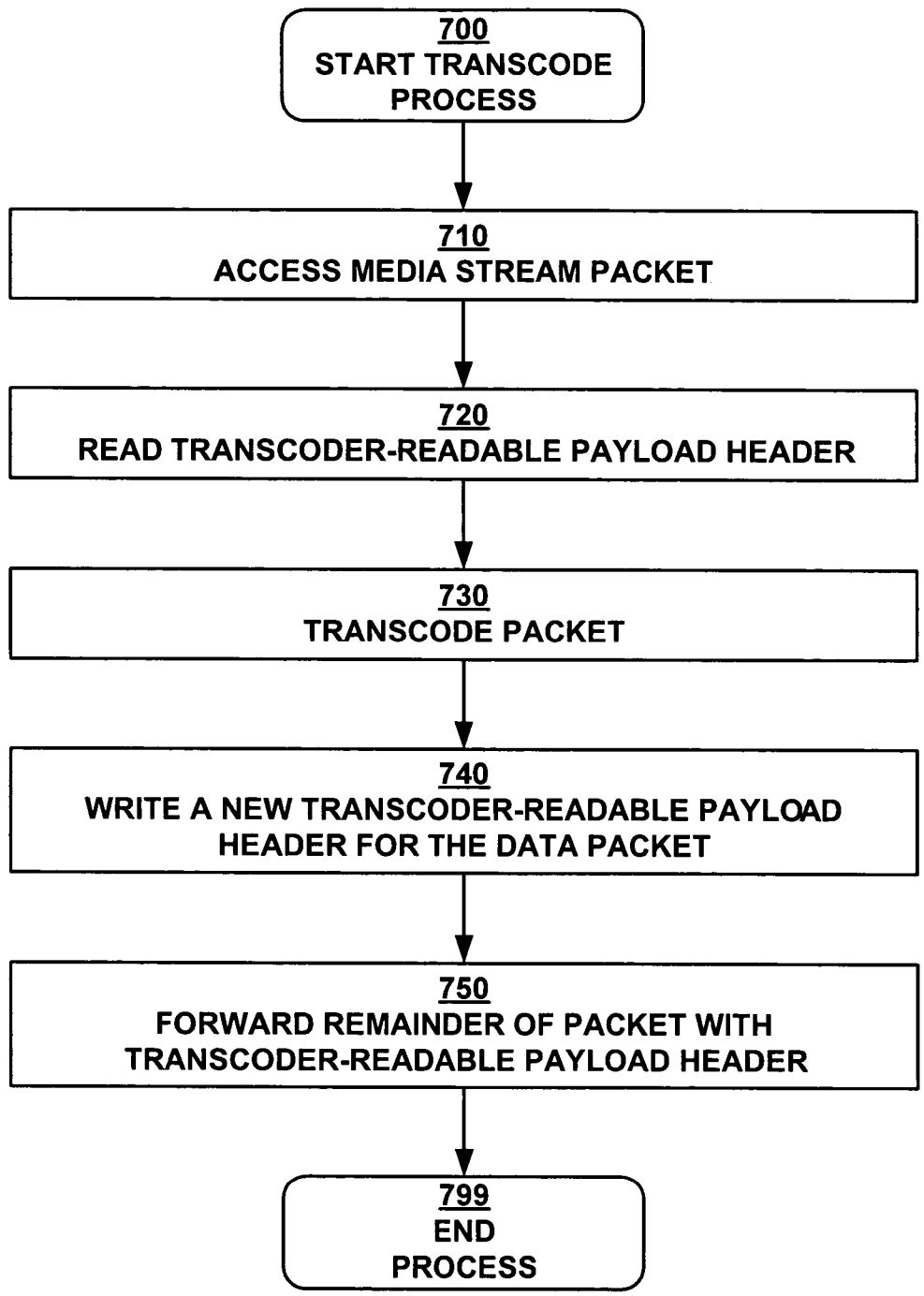
FIG. 7 illustrates a transcoding method in accordance with embodiments of the present invention.

FIG. 7 illustrates a block flow diagram of the transcoding process employed in embodiments of the present invention. Transcoding process 700 starts with accessing the media stream at 710. The media stream comprises packets with transcoder-readable payload headers which are read at 720. The transcoder-readable payload header contains information salient to the contents of the packet, such as truncation points, start and end points of each coded frame, the relative importance of each frame, etc. that can be used in determining whether to delete a given part of the packet. Deleting appropriate portions of a packet payload of a packet is accomplished at 730. It is noted that deleting a part of a packet without affecting the encryption or coding of the remainder of the packet produces a smaller packet, more amenable to communication, and re-transmission, in a bit-rate-limited environment or to a receiving device more amenable to a smaller packet. A transcoder-readable header is written, in some embodiments, at 740 and applied to the truncated data packet. Re-transmission or forwarding of the packet occurs at 750 and the process ends at 799.

Figure 8:
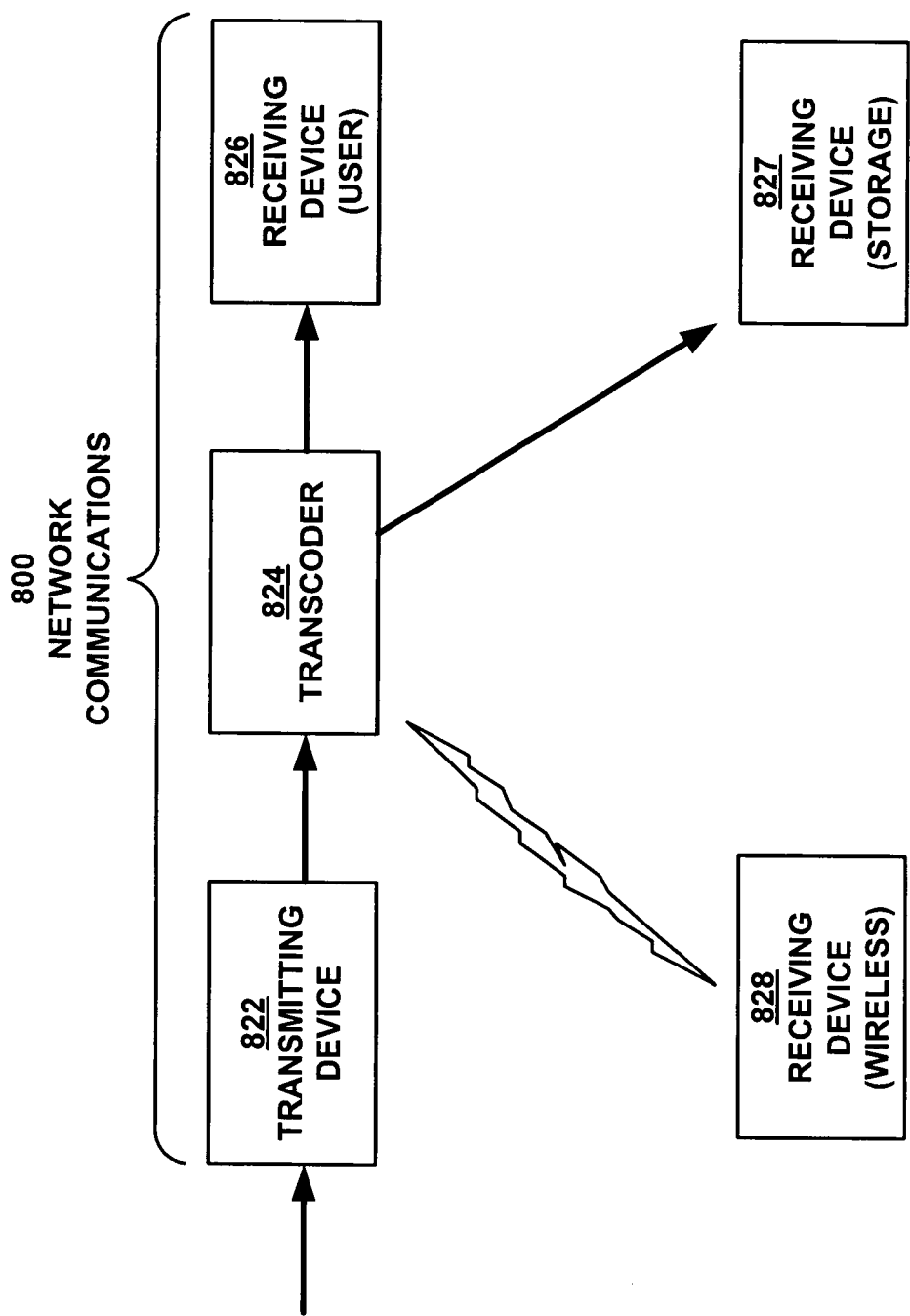
FIG. 8 illustrates a transcoding method in accordance with embodiments of the present invention.

FIG. 8 illustrates an example of operation of a transcoder in a network in accordance with embodiments of the present invention. In network communication 800, transmitting device 822 streams coded media in the network, with intended receivers such as user receiving device 826, receiving storage device 827, and wireless receiving device 828. In order to effectively reach the intended receivers or to provide an effective reception, or an efficient use of available communication infrastructure, or for other reasons, transcoder 824 transcodes the streamed media as discussed in the embodiments above. The transcoded streamed media is forwarded as appropriate to the intended receivers.

It is noted here that the actual implementation of transcoding can be accomplished in standalone processing at points between a transmitting device and a receiver. However, transcoding is not limited to standalone devices. In some implementation, transcoding can be a part of a transmitting device, which provides the advantage of giving access to an entire stream of data in making the transcoding determinations discussed above. Transcoding can also be implemented at receiving devices or at "edge servers," for example at the boundary of a network close to the clients. Furthermore, transcoding is not limited to a single device or to a single step. Transcoding may take place at all of these listed possibilities in a given transmission. However, in each case, transcoding is enabled to read a payload header and perform transcoding operations without needing to decrypt an encrypted, frame-coded, payload.

Embodiments of the present invention provide advantages to the communication of streamed media that are in addition to those discussed in reference to aiding communication security. By using a transcoder-readable payload header to determine the location of truncation points in a packet payload, a transcoder is not required to parse each packet in order to discern those truncation points. The elimination of the time-consuming parsing can greatly speed up the throughput of a system in which an embodiment of the present invention is in operation. This advantage is realizable in those cases where the payload is encrypted as well as those in which communication is unencrypted.

Embodiments of the present invention are expected to operate in a computer system. A configuration typical to a generic computer system is illustrated, in block diagram form, in FIG. 9. Generic computer 900 is characterized by a processor 901, connected electronically by a bus 910 to a volatile memory 902, a non-volatile memory 903, possibly some form of data storage device 904 and a display device 905. It is noted that display device 905 can be implemented in different forms. While a video CRT or LCD screen is common, this embodiment can be implemented with other devices or possibly none. Bus 910 also connects a possible alpha-numeric input device 906, cursor control 907, and, importantly in the context of embodiments of the present invention involved in the transmission, transcoding and reception of streamed media, communication I/O device 908. In various implementations, communication I/O device 908 may be realized as a modem, an Ethernet connection, a wireless device, or any other means of communicating signals between a computer system and a communications network.

An alpha-numeric input device 906 may be implemented as any number of possible devices, but is commonly implemented as a keyboard.

Figure 9:
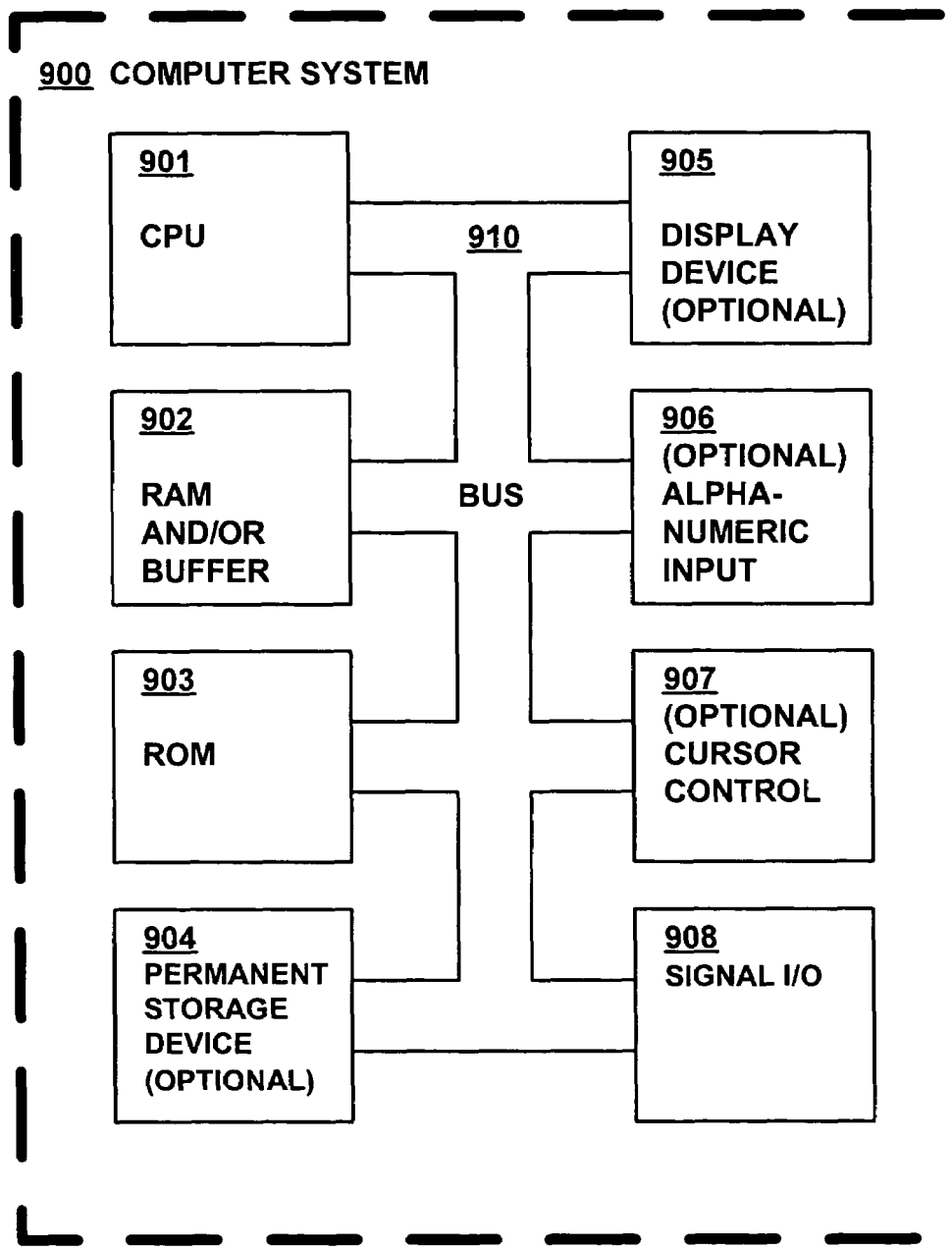
FIG. 9 illustrates an exemplary computer system in accordance with embodiments of the present invention.

In the foregoing discussion of embodiments of the present invention, references have been made to wireless and hand-held devices. The example of the generic computer of FIG. 9 also applies to those other devices in that the functions outlined in FIG. 9 are implemented even if the performance of the implementation is accomplished by a device of another name.

Accordingly, embodiments of the present invention provide methods and systems to enable a potentially untrusted transcoder in a network to transcode a media stream while still preserving the end-to-end security of the rest of the stream. Specifically, disclosed is a method and system for forming the data packet payloads, and for their transcoder-readable payload headers, such that, as long as the potentially untrusted transcoder performs the transcoding in the appropriate manner, the receiver is still able to receive streamed media data and any encryption of the transmitted data remains uncompromised.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. A method for providing transcodability to media data in a network, comprising:
   separating an amount of data into a segment; and
   combining said segment and a transcoder readable payload header into a data packet payload, wherein said segment comprises data coded in a plurality of frames and wherein said transcoder readable payload header comprises information associating a relative importance with each of said frames.

2. The method described in claim 1 wherein said frames are coded using a method comprising I, P and B-frames.

3. The method described in claim 1 wherein said frames are coded using an MPEG coding scheme.

4. The method described in claim 1 further comprising encrypting said segment.

5. The method described in claim 1 further comprising encrypting said transcoder readable payload header.

6. The method described in claim 5 wherein said transcoder readable payload header is enabled to be decrypted independently of other portions of said data packet.

7. The method described in claim 1 wherein said data packet payload is combined in a data packet with a packet header independent of said transcoder readable payload header.

8. The method described in claim 1 wherein said transcoder readable payload header comprises information identifying truncation points within said data packet payload.

9. The method described in claim 1 wherein said relative importance is based on frame dependency information associated with each of said frames.

10. The method described in claim 9 wherein said frame dependency information comprises the number of coded frames in said data dependent on said coded frame.

11. The method described in claim 1 further comprising forwarding said data packet.

12. The method described in claim 1 wherein said media data is retrieved from storage.

13. The method described in claim 1 further comprising storing said data packet in a storage medium.

14. A method for transcoding media in a network, comprising:
   accessing a data packet of said media comprising a payload and a transcoder readable payload header, wherein said payload comprises data coded as a plurality of frames;
   reading said transcoder readable payload header in said data packet; and
   transcoding said data packet using information in said transcoder readable payload header, wherein said information comprises a relative importance associated with each of said frames.

15. The method for transcoding media described in claim 14 further comprising buffering said data packet.

16. The method for transcoding media described in claim 15 wherein said media is communicated in a plurality of channels.

17. The method for transcoding media described in claim 14 further comprising forwarding said data packet.

18. The method for transcoding media described in claim 17 wherein said forwarding is accomplished in a plurality of channels.

19. The method for transcoding media described in claim 14 further comprising decrypting said transcoder readable payload header.

20. The method for transcoding media described in claim 14 wherein said transcoder readable payload header enables transcoding of said data packet while said payload remains encrypted.

21. The method for transcoding media described in claim 14 wherein said transcoding comprises truncating said payload.

22. The method for transcoding media described in claim 21 wherein said truncating comprises deleting a coded frame from said payload.

23. The method for transcoding media described in claim 14 wherein said transcoding comprises deleting said packet.

24. The method for transcoding media described in claim 14 wherein said data is stored in a storage medium.

25. A computer readable medium having a data packet stored therein for causing a functional change in the operation of a device, said data packet comprising:
   a payload;
   a transcoder readable payload header; and
   a packet header, wherein said payload comprises a plurality of coded frames and wherein said transcoder readable payload header comprises information associating a relative importance with each of said frames.

26. The computer readable medium described in claim 25, wherein said coded frames are coded using a method comprising I, P and B-frames.

27. The computer readable medium described in claim 25, wherein said frames are coded using an MPEG coding scheme.

28. The computer readable medium described in claim 25, wherein said transcoder readable payload header enables transcoding said data packet.

29. The computer readable medium described in claim 25, wherein said payload and said transcoder-readable payload header are enabled to be encrypted independently of said packet header.

30. The computer readable medium described in claim 25, wherein said transcoder-readable payload header is enabled to be decrypted independently of said payload.

31. The computer readable medium described in claim 25, wherein said transcoder readable header is enabled to be read independently of said payload.

32. The computer readable medium described in claim 25, wherein said transcoder readable payload header is enabled to be written independently of said coded frames.

33. The computer readable medium described in claim 25, wherein each of said coded frames is enabled to be deleted from said data packet independently of other coded frames in said packet.

34. The computer readable medium described in claim 32, wherein said data packet is stored in a storage medium.

* * * * *

UNITED STATES PATENT AND TRADEMARK OFFICE
CERTIFICATE OF CORRECTION

| | |
|---|---|
| PATENT NO. | : 7,505,590 B1 |
| APPLICATION NO. | : 10/617348 |
| DATED | : March 17, 2009 |
| INVENTOR(S) | : John Apostolopoulos |

It is certified that error appears in the above-identified patent and that said Letters Patent is hereby corrected as shown below:

On the title page, item (75), in "Inventor", in column 1, line 1, delete "Palo Alt," and insert -- Palo Alto, --, therefor.

In column 12, lines 24-25, in Claim 16, delete "claim 15" and insert -- claim 14 --, therefor.

Signed and Sealed this

Twenty-fifth Day of August, 2009

David J. Kappos
*Director of the United States Patent and Trademark Office*